(12) United States Patent
Flack et al.

(10) Patent No.: US 12,159,170 B2
(45) Date of Patent: Dec. 3, 2024

(54) SERVICE PLATFORM WITH CONFIGURABLE ELECTRICITY USAGE CHARACTERISTICS

(71) Applicant: Akamai Technologies, Inc., Cambridge, MA (US)

(72) Inventors: Martin T. Flack, Denver, CO (US); Michael Bishop, Cincinnati, OH (US); Stephen Ludin, Mill Valley, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 522 days.

(21) Appl. No.: 17/451,620

(22) Filed: Oct. 20, 2021

(65) Prior Publication Data

US 2023/0119151 A1 Apr. 20, 2023

(51) Int. Cl.
| | |
|---|---|
| *G06F 9/48* | (2006.01) |
| *G06F 1/18* | (2006.01) |
| *G06F 1/3206* | (2019.01) |
| *G06F 1/3234* | (2019.01) |
| *G06F 9/50* | (2006.01) |
| *G06F 11/34* | (2006.01) |

(52) U.S. Cl.
CPC ............ *G06F 9/5094* (2013.01); *G06F 1/189* (2013.01); *G06F 1/3206* (2013.01); *G06F 1/3234* (2013.01); *G06F 9/5088* (2013.01); *G06F 11/3433* (2013.01)

(58) Field of Classification Search
CPC ...... G06F 1/329; G06F 9/4843; G06F 9/4881; G06F 9/4887
See application file for complete search history.

(56) References Cited

U.S. PATENT DOCUMENTS

| | | | |
|---|---|---|---|
| 6,029,175 | A | 2/2000 | Chow et al. |
| 6,108,703 | A | 8/2000 | Leighton et al. |
| 7,058,706 | B1 | 6/2006 | Iyer et al. |
| 7,096,263 | B2 | 8/2006 | Leighton et al. |
| 7,096,266 | B2 | 8/2006 | Lewin et al. |
| 7,240,100 | B1 | 7/2007 | Wein et al. |

(Continued)

OTHER PUBLICATIONS

ISO, "14064-1:2018", Greenhouse gases—Part 1: Specification with guidance at the organization level for quantification and reporting of greenhouse gas emissions and removals, 2018.

(Continued)

*Primary Examiner* — Andy Ho

(57) ABSTRACT

A multi-tenant service platform provides network services, such as content delivery, edge compute, and/or media streaming, on behalf of, or directly for, a given tenant. The service platform offers a policy layer enabling each tenant to specify levels of acceptable performance degradation that the platform may incur so that the platform can use electricity with desirable characteristics to service client requests associated with that tenant. Service nodes in the platform (e.g., edge servers) enforce the policy layer at the time of a service request. Preferably, the 'quality' of the electricity is a measurement of source of the energy, e.g., whether it is sourced from high-carbon fossil fuels (low-quality) or low-carbon renewables (high-quality). If the desired quality of electricity cannot be achieved, the node can resort to using less electricity to handle the request, which is achieved in a variety of ways.

17 Claims, 2 Drawing Sheets

(56) References Cited

U.S. PATENT DOCUMENTS

| | | | |
|---|---|---|---|
| 7,251,688 | B2 | 7/2007 | Leighton et al. |
| 7,274,658 | B2 | 9/2007 | Bornstein et al. |
| 7,293,093 | B2 | 11/2007 | Leighton et al. |
| 7,359,985 | B2 | 4/2008 | Grove et al. |
| 7,484,002 | B2 | 1/2009 | Swildens et al. |
| 7,523,181 | B2 | 4/2009 | Swildens et al. |
| 7,574,499 | B1 | 8/2009 | Swildens et al. |
| 7,603,439 | B2 | 10/2009 | Dilley et al. |
| 7,716,367 | B1 | 5/2010 | Leighton et al. |
| 7,725,602 | B2 | 5/2010 | Liu et al. |
| 7,912,978 | B2 | 3/2011 | Swildens et al. |
| 7,925,713 | B1 | 4/2011 | Day et al. |
| 7,996,531 | B2 | 8/2011 | Freedman |
| 8,195,831 | B2 | 6/2012 | Swildens et al. |
| 8,199,654 | B2 * | 6/2012 | Francisco ............... H04L 45/22 709/224 |
| 9,942,363 | B2 | 4/2018 | Stevens et al. |
| 11,477,322 | B1 * | 10/2022 | Ambekar ............ H04M 3/5232 |
| 11,797,416 | B2 * | 10/2023 | Kulkarni ............. G06F 11/3668 |

OTHER PUBLICATIONS

Martin, B. E., "HTTP Response Header Field: Carbon-Emissions-Scope-2", IETF Internet-Draft draft-martin-http-carbon-emissions-scope-2-00, available at https://datatracker.ietf.org/doc/draft-martin-http-carbon- emissions-scope-2/00/, Apr. 3, 2023.

Adams, C., "Packets: yet another lever for a low carbon internet," Jul. 24, 2019, 18 pages. Downloaded on Oct. 1, 2021. Available at https://www.thegreenwebfoundation.org/news/packets-yet-another-lever-for-a-low-carbon-internet/.

Deng, Nan, "Systems Support for Carbon-Aware Cloud Applications," 2015, 140 pages, Ohio State University Dissertation.

Golden, S., "The future is climate-friendly software," Jun. 4, 2021, 5 pages. Downloaded on Oct. 1, 2021. Available at https://www.greenbiz.com/article/future-climate-friendly-software.

Google, "Carbon free energy for Google Cloud regions," 5 pages. Downloaded on Oct. 1, 2021. Available at https://cloud.google.com/sustainability/region-carbon.

Google, "We now do more computing where there's cleaner energy," May 18, 2021, 4 pages. Downloaded on 101/21. Available at https://blog.google/outreach-initiatives/sustainability/carbon-aware- computing-location/.

Nygren, E. et al., "The Akamai Network: A Platform for High-Performance Internet Applications," ACM SIGOPS Operating Systems Review, vol. 44, No. 3, Jul. 2010, 18 pages.

Podder, S. et al., "Harvard Business Review: How Green Is Your Software?", Sep. 18, 2020, 12 pages.

Qureshi, A. et al., "Cutting the Electric Bill for Internet-Scale Systems," SIGCOMM'09, Aug. 17-21, 2009, Barcelona, Spain, 18 pages.

\* cited by examiner

SERVICE PLATFORM WITH CONFIGURABLE ELECTRICITY USAGE CHARACTERISTICS

BACKGROUND

Technical Field

This application generally relates to computing platforms, such as content delivery networks and cloud computing, and also relates to the control and configuration of such platforms.

Brief Description of the Related Art

Computing platforms such as content delivery networks (CDNs) provide a variety of services to end users on behalf of digital property (e.g. domain name, subdomain, API, etc.) owners. Such platforms are often implemented as multi-tenant platforms. Each tenant is able to configure how the platform handles requests made by end user clients associated with the digital properties of that tenant. Example configuration systems in the CDN space include U.S. Pat. Nos. 7,240,100 and 9,942,363, the teachings of which are hereby incorporated by reference in their entireties.

While such configuration systems have become very complex and powerful, they are generally targeted at the upper layers of the network stack. Tenants have not been able to control or influence the source of electricity (including in particular the carbon impact of the source) used by the platform to handle a given client request on that tenant's behalf. This patent document discloses technology for doing so.

More information about CDN technologies, as well as proxy server technologies, can be found in the following documents, the teachings of which are hereby incorporated by reference in their entireties: U.S. Pat. Nos. 6,108,703; 7,293,093; 7,096,263; 7,096,266; 7,484,002; 7,523,181; 7,574,499; 7,240,100; 7,603,439; 7,725,602; 7,716,367; 7,996,531; 7,925,713; 7,058,706; 7,251,688; 7,274,658; 7,912,978; 8,195,831.

The teachings presented herein improve the functioning of a computer system itself by (among other things) making it more efficient and configurable. Those skilled in the art will understand these and other improvements from the teachings hereof.

BRIEF SUMMARY

This section describes some pertinent aspects of this invention. Those aspects are illustrative, not exhaustive, and they are not a definition of the invention. The claims of the issued patent define the scope of protection.

A multi-tenant service platform provides network services, such as content delivery, edge compute, and/or media streaming, on behalf of, or directly for, a given tenant. The service platform offers a policy layer enabling each tenant to specify levels of acceptable performance degradation that the platform may incur so that the platform can use electricity with desirable characteristics to service client requests associated with that tenant. Service nodes in the platform (e.g., edge servers) enforce the policy layer at the time of a service request, attempting to minimize the degradation from baseline while maximizing the improvement in the 'quality' of the electricity. Preferably, the 'quality' of the electricity is a measurement of source of the energy, e.g., whether it is sourced from high-carbon fossil fuels (low quality) or low-carbon renewables (high quality). Hence, a tenant has the ability to choose the quality level used to handle their traffic and compute load. By logging the results of the policy layer enforcement, the service platform can report reliably on the quality of the electricity used for the tenant. If the desired quality of electricity cannot be achieved, the node can resort to using less electricity to handle the request, which is achieved in a variety of ways.

The claims are incorporated by reference into this section, in their entirety.

BRIEF DESCRIPTION OF THE DRAWINGS

The invention will be more fully understood from the following detailed description taken in conjunction with the accompanying drawings, in which.

Figure 1:
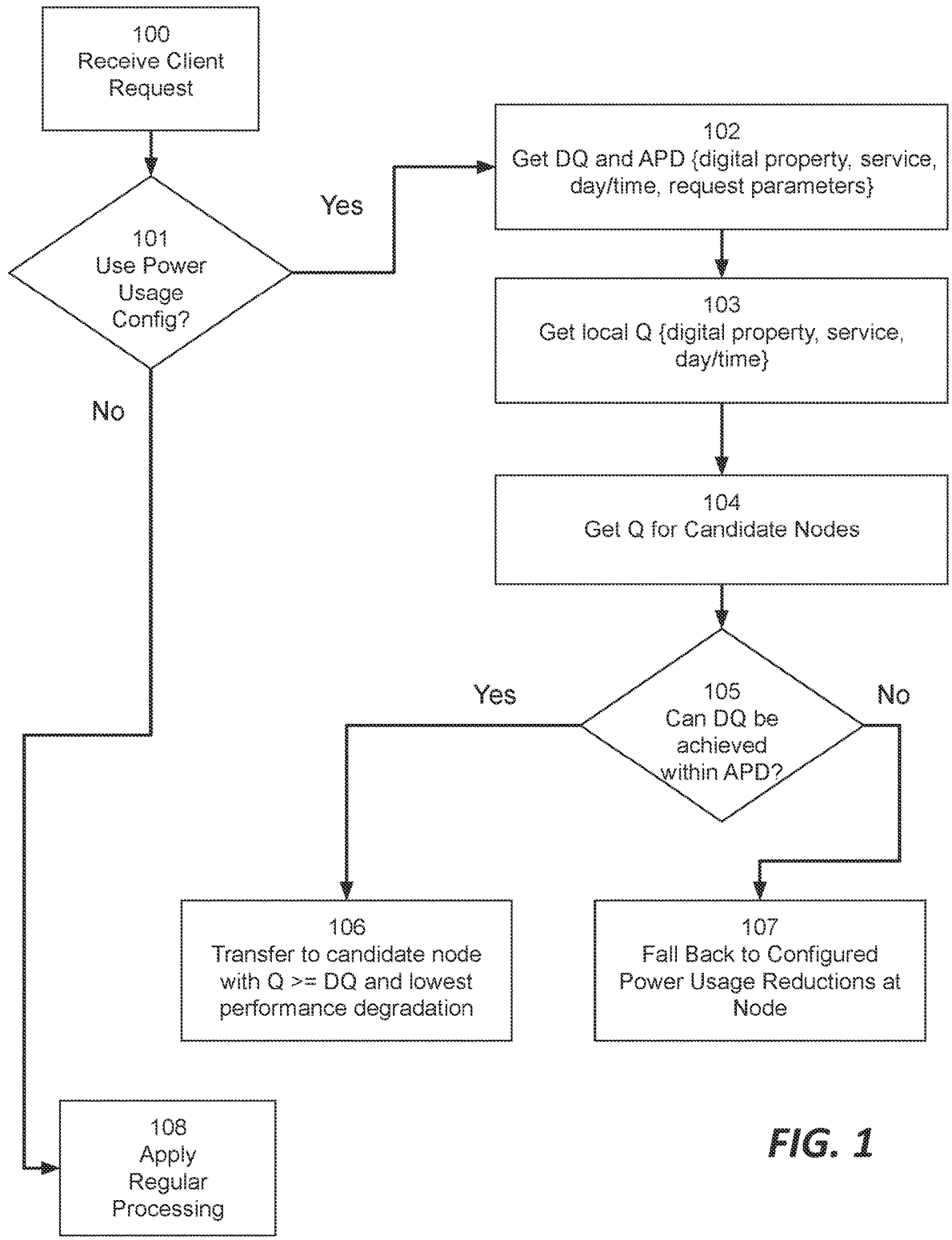
FIG. 1 is a flow diagram providing an overview of how a node can incorporate power usage configuration into its request handling workflow, in accordance with one embodiment of the teachings hereof; and, FIG. 2 is a block diagram illustrating hardware in a computer system that may be used to implement the teachings hereof.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatuses, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, GraphQL, HTTP versions 1.1 2, and 3, MQTT, TCP/IP, and UDP, is assumed. Likewise, basic familiarity with well-known serverless functions, containers, virtual machines, and hosted compute services, is assumed, is assumed.

All references to HTTP should be interpreted to include an embodiment using encryption (HTTP/S), such as when TLS-secured connections are established. While context may indicate the hardware or the software exclusively, should such distinction be appropriate, the teachings hereof can be implemented in any combination of hardware and software. Hardware may be actual or virtualized.

Overview

A digital property owner configures a service platform with preferences and constraints related to source of electricity and web-related (or other service-related) performance. When a CDN node receives a request on behalf of a digital property, the node has methods to determine what course of action to take that differs from the standard approach of resolving a request, with such configuration taken into account.

Using these methods, a digital property owner can control or influence the type of electricity (e.g. sourced from renewable sources, etc.) used by the platform to handle requests on its behalf. It may be desired for carbon savings to often outweigh best performance; while realizing the important reality that carbon savings cannot become an outright goal in every instant decision, and thus a balance must be achieved.

Any service provided by a computer platform may be configured to improve the nature of the electricity consumed to provide it. While object delivery is one example, arbitrary computation and compute-at-edge services (e.g., in the form of serverless functions, containers, and virtual machines) are also excellent candidates.

In the description below, a CDN is used as an example of a multi-tenant service platform. More information about CDNs, which are known in the art, is provided at the end of this document.

Power Quality 'Q'

Each node in the CDN can have data on its power quality, and a function that at any given moment can return a single number or other indicator that conveniently represents a score of its power quality. This number or other indicator is referred to as "Q" in this patent document. The notion of quality is intended to refer to a relevant attribute of the electricity that is being consumed. The prime example in this patent document is the source of the electricity, that is, whether it is sourced from carbon-intensive or low-carbon, renewable sources. Ideally the Q value is exposed as a baseline variable for usage in node configuration all the way up to digital property owner specified configuration and serverless compute capabilities. Imagine inside a serverless compute container a function call such as request.server.renewablePowerScore( ) to query the current node's energy supply and then make consequent decisions.

The CDN network can use a scale for Q, for example, such as 0-5 inclusively, where 0 represents the least-favorable quality of power and 5 is the most-favorable quality of power. On this scale, the possible values are the integers 0, 1, 2, 3, 4, and 5; the value 0 may represent high assurance of continuous hydrocarbon power with no possibility of renewable power (put simply, "bad"), and 5 may represent high assurance of continuous fully-renewable power (put simply, "good"). The numbers in-between may represent levels of assurance or mixes of power source that change. A pure renewable source may score equally or greater than a hydrocarbon source that is offset for carbon; continuing the example numbers above, for example, 4 may represent a hydrocarbon-based power source but fully offset by contract with the utility or the datacenter for appropriate carbon mitigation. A graduated scale may be best suited for networks where most nodes in the network lack the mechanism to query or be signalled their current power source type.

Other similar scales may be used, such as 0 or 1, to indicate a boolean truth for "good" power. This may be more appropriate for networks where most nodes in the network do have a mechanism for understanding their power source type. However, hereinafter, this document will assume a Q scale of 0 to 5 inclusive.

The Q for a node (that is, the quality of power) may be given by a wide variety of techniques. A static value may be configured for a node where the power source is well-known and unchanging, or by contract with the power utility has been fixed to a renewable source. A schedule based on the current local time may be employed to change between values where power mix changes according to a known (exactly or approximately known) schedule. Some datacenters are capable of signalling constituent servers when power source type changes, and in those cases, Q may be read from a data store managed by a subsystem on the node or in the same datacenter that receives, parses, and saves such signals.

Acceptable Performance Degradation (APD) for Maximum Power Quality

Each configuration for a digital property on the CDN can express a variable which essentially establishes how much performance degradation the digital property owner is willing to accept in exchange for increasing Q to reach a desired Q value (referred to herein as "DQ"). This variable is referred to as the "acceptable performance degradation" or APD, and it may be expressed differently and represent different things for different types of services and/or traffic. One example is where APD is a time, or latency. In other words, the APD would indicate an acceptable increased latency (or delay) in response in exchange for achieving DQ in the electrical power used to provide that response. Another example is where APD is a bitrate. APD as a bitrate is particularly useful for media streaming use cases. In such cases, the APD would indicate an acceptable decrease in bitrate or bitrate floor in exchange for achieving that DQ in the electrical power used to serve that stream segment(s).

Consider the case where APD is a time value APD_t. If Q' is defined to be min 0 and max 5, where 5 is "best", and for a given node receiving a service request, Q=0, and the digital property expresses APD_t=100, then that expression indicates that a computation-heavy action may be transferred to a Q=5 node at a time latency cost of 100 ms (single-trip). (Note this assumes that DQ is the maximum Q value.) Of course, the APD value may also be expressed as a round trip time, or as a time cost relative to a specific sub-process or action that the node must perform to respond to the request.

It may be possible to generate a response to the request locally at the node that received the request, at Q=0. But given the digital property configuration, the node will incur delay in resolution of the request in order to shift compute to a carbon-friendly Q=5 node. In some embodiments, APD_t=100 can imply that for a cost of maximum 80 ms an upgrade from Q=0 to Q=4 is allowed; for a cost of maximum 60 ms from Q=0 to Q=3, i.e., a linear function. Or a digital property owner could configure APD_t for each step in the Q-scale.

For streaming video cases, APD_t may be a lower value for the first few segments of video (covering the first few seconds of the video stream) and then higher value for further segments (meaning greater acceptable delay in segment delivery), on the assumption that the client has started playing, and has built up a buffer. For streaming video cases, a video stream which requires modification in realtime to send to the client, such as transcoding, downscaling, upscaling, ad stitching, digital on-screen graphic overlay, etc., may be appropriate to consider a computationally expensive action.

The APD variable may be set statically by a customer for a given digital property and published in the configuration that is distributed to nodes. Alternatively, it can be propagated from a default for all, or groups, of digital properties. It may change based on a schedule based on the current local time of the node handling a request. It may be propagated through a pub/sub message distribution system, or a side configuration channel, for rapid or easy updates. It may depend on configured factors of the instant request, such as (for an HTTP request) the path, filename, file extension, a cookie value, the protocol, etc., as expressed in configuration conditionals which are already industry practice in CDN's; this may reduce carbon sensitivity for hits commensurating a commerce-related checkout, for example.

Using Less Power when Q Cannot be Improved

In most cases, multiple conditions must be met for a node to be permitted to transfer a client request to a higher-Q node. For example, the digital property must be configured with DQ and APD values, and a candidate node with Q>=DQ must be available (not overloaded) and close enough so as not to exceed the APD value.

When a node cannot transfer a request to another higher-Q node within the constraints of DQ and APD, it may instead reduce the power that it uses to process the request. Put another way, the node's first option is to do the work in a higher-Q location; if that is not possible, the node can fall back to doing less work and thereby use less of its own low-Q power. Regardless, the digital property owner's overall power mix is improved.

Preferably, a digital property owner specifies the behavior of a node when seeking to reduce power usage. The digital property configuration can express this behavior in terms of a feature or feature set that may be omitted when servicing a request. For example, a digital property owner may elect that an image file should not be compressed when the network cost of shipping the big image is less than the power cost of transforming it. Or prefetching might be disabled, or certain performance monitoring or enhanced logging features disabled. Examples are provided later.

Each action that reduces power can be associated with a value (referred to herein as 'P') which reflects the amount of processing that is saved by omitting a feature. The value of P may be measured in terms of CPU cycles, or a calculation that derives from CPU cycles (to normalize for different CPU models and architectures), for example. The savings can be logged, accumulated across nodes, and reported as an aggregate number to the digital property owner.

Example—Request Handling at Node with Q and APD

FIG. 1 provides a general overview of the logic driving how a node (such as an edge server) handles a client request in accord with one embodiment of the teachings hereof. As will be understood by those skilled in the art, a node may apply a variety of service configurations and directives in handling a given request, and may apply them at various stages of the request handling process. FIG. 1 only focuses on those aspects relevant to the teachings hereof.

At 100, the node receives the client request (an HTTP request for example). At 101, the node checks the digital property owner's configuration for this domain (or subdomain, or path or object) to determine whether a power usage configuration has been specified. If not, then the request is handled in the usual manner known in the art, typically locally at the node, and with a variety of service features specified by the digital property owner (shown at 108).

If a power usage configuration has been specified, then the node proceeds to 102. At 102, the node determines the digital property owner's desired power quality (DQ) and the associated acceptable performance degradation (APD). Either or both of those values may depend on parameters such as attributes of the client request, the service being requested, or conditions at the node. This is indicated by the example set of arguments in 102. Some of these arguments, in particular the request parameters, may come from HTTP header fields, if HTTP is used, for example.

At 103 the node determines its own Q value. Again, the Q value may be a function of various arguments, as shown in 103. The Q value can be obtained from a local process running on the node in communication with the datacenter in which it is located, or with a centralized management system that collates such data, for example. The Q value can be cached for some period of time.

At 104, the node determines the options that might enable it to meet DQ (of course, if the node's own Q already meets DQ, then it can simply proceed to process the request locally). At 105 the Q values of other nodes are obtained— i.e., other "candidate" nodes to which the request and its associated processing load could be forwarded. The sub-process of obtaining a list of eligible higher-Q nodes is explained in more detail later, but in general it can involve consulting a mapping system with previously developed maps directing the node to nearby nodes of a suitable Q level which are not overloaded and otherwise meet the requirements of the digital property's service configuration. Each candidate node returned by the mapping system can be associated with a latency stored at the node (or given in the mapping system response, e.g., in a DNS field), which the node uses to assess performance degradation.

At 105, the node determines whether it can achieve DQ within the constraint of APD (based on the latency to the candidate node of Q>=DQ). If yes, then the node proceeds to transfer the request to that node, as indicated in 106. The "transfer" of the request may be accomplished in a variety of ways, such as a proxy operation using a forward request, a redirect, or otherwise as explained in this document.

If the node is unable to achieve DQ within the constraint of APD, then logic moves to 107 in FIG. 1. It is assumed at 107 that the client request (and associated workload) must be handled at the current node, even though the node does not have a Q value that achieves DQ. At 107 the node returns to the digital property configuration to see what the digital property owner has specified as a fall-back strategy. As mentioned, the strategy is generally to use less power at the node. Doing so can help the digital property owner's carbon footprint indirectly: by reducing power usage at the node, it may be possible for the node's data center to utilize cleaner forms of energy without invoking dirtier peaking units (ultimately the node's Q may increase, upon refresh); also, the digital property owner's aggregate power usage across the service platform will decrease. As a side effect, omitting features may have the benefit of reducing power usage elsewhere in the service platform (e.g., if the omitted service features require use of other low-Q resources such as distinct nodes to prepare image derivatives or remote communications to get higher quality or fresher versions of content than available locally at the node).

To reduce power, the digital property owner can specify a set of service features that may be omitted in handling the request. The expendable service features may be dependent on attributes related to the request (e.g., client, end user, use agent, service requested, domain, day/time, other request parameters). Or, the expendable service features may be dependent on achieving some desired target of power savings, measured in units P as described above. For this latter option, each expendable service feature could be associated with a savings in P and the node can select sufficient features (e.g., in a priority order) to achieve the desired P-savings. In extreme cases, the digital property owner could specify that the fall back is to ignore the request, or tell the client to try again later (e.g., overnight when power usage is lower and typically more efficient units are providing all of the electric load).

Overrides and Exceptions

In some embodiments, a node may override Q and/or APD values under extremely light or extremely heavy load on itself or on the various nodes (of potentially heterogeneous functions or server types) in the locale which would likely service requests. The entire network may be forced to use a particular Q or APD value for some period of time while under stress or during scheduled events of massive importance when the continuous availability of the network is paramount.

In some embodiments, intermediate upgrades in Q, e.g., from 3 to 4, could be entertained. But in other embodiments, despite technically being a valid upgrade for a multi-level scale such as Q from 0 to 5, an upgrade of a single point, e.g. 4 to 5, would not be undertaken as a hard rule, in order to keep some efficiencies.

A digital property owner may set APD values to very high or very low values to ensure a particular outcome. For example, one might set a very high APD_t value, e.g., 4000, to virtually ensure that computation heavy actions only occur at high quality nodes, in most normal Internet conditions. One might set the APD_t to "infinity" to force that result in all cases without exception.

How to Upgrade Q

Most CDNs have the ability to configure one node to make a request to another node in the same CDN before, if necessary, making the request to a configured "origin" web server. This is called forwarding the request. On some CDN's, ICP (Internet Cache Protocol) may also be utilized, either locally (on a LAN) or between servers. This is a lightweight protocol and method to ask all peers closeby if they have the requested object.

When CDNs provide services such as arbitrary computation or image compression, they are often implemented as services that speak HTTP(s). This may be called forwarding the request; or it may be called making an interprocess call or a microservice request. Some features may not be available over HTTP(s) but rather over Unix domain sockets, WebSockets, direct TCP/IP sockets with custom protocols, or other mechanisms.

This patent document refers to all of the above techniques to request processing from another server/service as "forwarding", and "forwarding the request" even if only a preliminary request is being made.

For a small or moderately-sized CDN, Q values may be expressed through a pub/sub or gossip protocol known in the art. Thus, with a time lag, and while not partitioned (in a CAP theorem manner), all nodes are aware of all other nodes' power quality scores, and the decision to forward can be made on that information. This would generally be tied to full data about the network itself.

For large CDN's, global network state is generally not shared, and decisions about where to forward requests in the general sense are often abstracted to use subsystems for that purpose that access mapping data. DNS may be utilized to access the mapping system and select a suitable target. In such a system, Q maps may be provided.

A domain name such as www.example.com in DNS may CNAME to the production CNAME of the public map that serves requests for the product or service to which the customer has subscribed to serve that domain name. This could be a general map, or it may in fact already be a Q=5 map to insist on renewable energy only from the outset of handling a client request. If it is a general map, then the first node may serve the request by performing actions that are deemed low-carbon-cost irrespective of success or failure in resolving the request, or required for security irrespective of carbon cost; and then that node may pass the request onwards as normal, but if some high-computation act is required, such as running a Javascript function, the algorithm described above may be employed to determine if forwarding to a high quality power node is a good cost-benefit solution.

In this latter case, the node may lookup a Q=5 map using an internal subsystem or DNS, and thus acquire a recommended IP address to which to forward the request, which may take into account various factors such as current load, but would also presumably be as close as possible to the current node given the rubric employed. The current node would then consult a local data store or cache for recent historical timing information (subject to some time-to-live) to reach that suggested node, in order to make a determination. For example, if that node were known to recently have taken 80 ms to reach, then from a Q=0 node with t>=80 that would be an acceptable forwarding target.

When a node forwards a request, it may add a header to request a turn-around time from the receiving system; or the network may in general have internal node requests always report to each other the turn-around time. The turn-around time is the amount of time spent processing the request, and allows the originator to deduct that time from a local timer counting from the first byte of the forwarded request leaving to the first byte of the response arriving and thus determine the round-trip network latency between the nodes. The single-trip network latency is then deemed to be half of that. This method of obtaining timings is a timing-by-experience method.

Alternatively, an ICMP ping may be used out-of-band from the HTTP request in order to establish a timing, which may be initiated just before the HTTP request is transmitted; and will presumably be resolved before the HTTP response is received.

Alternatively, statistics from the TCP/IP stack or QUIC stack serving the HTTP layer for the forwarded request may be solicited to report a timing between the current node and the forwarded node.

Because it may be useful to have timings occasionally, if a system is relying upon timing-by-experience, it may occasionally, e.g., randomly, forward requests to Q maps that are not the one currently selected by the algorithm, in order to generate timing data which can be used for future calculations. For example, it may happen that a candidate node choice on a Q=5 map is so close to the current node, represented by a near-zero single trip time, that this becomes almost a default choice, but it may be desirable to occasionally test the timing to other Q maps notwithstanding the availability of a Q=5 map member so close-by.

Maps for lesser-quality nodes may include better-quality nodes too, if the business purpose of the maps is to allow carbon-sensitive selection but otherwise provide the best service; thus maps such as Q0-5, Q1-5, Q2-5, Q3-5, Q4-5, and Q5 rather than Q1, Q2, Q3, Q4, Q5. This is because carbon-insensitive decisions would still be served from Q=5 nodes if possible, providing that network map with large capacity and close-by service to most global clients. However, it is possible that a business requirement mandates that carbon-sensitive decisions are prioritized for those customers making that election; thus the maps may be structured according to the latter, or some mixture that prioritizes Q=5 nodes alone; or the prioritization may be internal to the mapping system decision algorithm, prioritizing a certain amount of Q=5 traffic to Q=5 nodes and allowing the remainder of capacity there to be used by the more general purpose maps.

It should be understood that Q maps can incorporate the constraints of conventional maps. For example, for some digital properties it is desirable (for regulatory or accounting reasons) to constrain the choice of node to those within the same country or jurisdiction as the client. For Q maps on such digital properties, this means that the mapping system would provide a set of high Q nodes to which a client request can be transferred, where all of the nodes are in the same country or jurisdiction as the initial node.

Triggers to Upgrade Q

A node may decide whether to upgrade Q on a request-by-request basis. (See box 101, FIG. 1.) As part of 101, here are some potential triggers for invoking power usage configuration to upgrade Q or failing that, reduce power usage:

- An action which requires arbitrary computation of a kind where code is supplied by the customer, such as a Function-As-A-Service or a virtual machine hook.
- An action which requires a significant amount of computation provided by a feature of the CDN, such as Image Manipulation.
- An action which is classic to a CDN, such as cache-serving, but fits certain criteria that make it expensive in carbon terms; e.g., a very large object with a long TTL which is not in RAM (irrespective of disk) at the first node may be better served by forwarding to a Q=5 node where, if the object must be read from spinning disks, or requires compression computation on the whole object, would be "cheaper" in carbon terms. In making the decision that an action is "expensive", the system may take into account all predictable requests or other actions that would naturally follow—e.g., for a video stream, upon the first segment requested, all subsequent segments of the same stream at the same quality.

Alternative Service

There are several ways to transfer to a candidate node. Instead of forwarding a request or job to a candidate node, the initial client-facing node may issue an ALTSVC frame or Alt-Svc HTTP header for "alternative service" at another IP address. Advertising alternative services to clients is known in the art, see, e.g., M. Nottingham et al., "HTTP Alternative Services" IETF RFC 7838, April 2016 and M. Bishop, "Distributed HTTP Origins: Solution Space Exploration" IETF Internet Draft draft-bishop-httpbis-distributed-origin-00, Oct. 4, 2021.

Issuance of an "alternative service" message would cause a compliant client to direct future requests to the given IP address, and obviates the need to maintain the connection to the first node. This may be especially useful for streaming video and other media uses of this method, explored below.

APD for Media Streaming

As mentioned, for streaming video and other media formats, the APD variable described above may, instead of being a single time latency budget, be expressed as a time latency budget per segment or set of segments. In other words, the acceptable latency for the initial N multimedia segments may be lower while for later segments the acceptable latency may be higher. This means that a stream may start from a given node and then shift (via redirect or alt-service announcement) to another higher-Q node with higher latency to the client.

Invoking Higher Q with Performance Hit for Bots, or Other Clients

Even if a digital property owner is not interested in trading off APD for higher Q for human traffic, bot traffic (i.e. automated systems making HTTP requests) is often not as sensitive to performance characteristics (with a notable exception for some major search engines that do record and analyze performance).

Hence, a digital property configuration may set the value $APD\_t'$ as follows: 500 milliseconds for bots in general, 50 for human or inconclusively-attributed traffic, and 5 for GoogleBot and similar bots. This would create a permissive time window for carbon sensitivity that is regulated by the identification of the client's importance and purpose. Methods to determine whether a client is a bot or a human (e.g., from user agent headers, recaptcha, or otherwise) are known in the art.

If a digital property owner was willing to entertain carbon sensitivity only for bots, a setting of $APD\_t=500$ milliseconds for bots in general, and 0 for humans, inconclusively-attributed traffic, and GoogleBot etc., might make sense. Or it could be set to 1000 or 2000 with probably fairly similar outcomes but more permissiveness. Likewise, the fall back of using less power (107) could be considered only if the client is a bot, and otherwise the full-featured service provided.

List of Example Actions to Improve Q

Providing Maps Based on High-Q Power. As mentioned, the maps used to direct traffic into the network could be enhanced to provide maps that hit only nodes that use $Q>=DQ$ power sources in the first hop.

Routing edge compute jobs or virtual machines to High-Q Locations. As mentioned, nodes which receive a request necessitating edge computation could make a decision to forward that request to a relatively nearby node. This may be more for longer-running jobs/processes, e.g. those that will involve execution over, say, 10 ms. This is an example of a configuration choice where the more performant action (staying closer to the current node) is passed over for an environmental choice.

Display Carbon Score of Each Version of Each Digital Property. Ideally, on the list of versions of each configuration of each deployed digital property, one could see a column that shows the environmental impact score of that respective configuration, possibly in absolute terms or relative terms to the prior version. In keeping with the maxim "anything measured improves," this will enable the user to assess how configuration changes affected the world. Similarly, event timeline graphs that show traffic ebbing and flowing could also show environmental impacts along with hits and bytes.

The nature of the numbers shown as carbon impact scores might be something along the lines of a single algorithmically generated number that blends together various bucketed numbers. Those bucketed numbers, unfolded, could display, for example, wattage per petabyte served in pure/mostly renewable energy contexts, mixed contexts, and hydrocarbon contexts. The blended score would put those pieces together (and possibly blend the Q value achieved with the reduction in power usage as measured by P, for those situations where only power reduction was available). Obviating compute or shifting compute successfully to alternate areas would bolster the blended score. Wattage is an easier score to establish than fractions of tons of carbon, and more objective, but still real. One could analyze wattage of CDN servers in racks, something likely known to CDN operators, and develop ways to estimate it within sensible accuracy.

Reduced Network Hops to Save Emissions. Assuming every network hop adds to the carbon cost of a packet as it traverses routers, cutting down on those hops will reduce that impact. CDN nodes use much more power than routers; cutting down on the number of CDN node hops will reduce carbon impact.

List of Example Actions to Reduce Power Usage and P

Request Header for Only Give Answer if Cheap Carbon-Wise. A request header from a smart client could request an object if-and-only-if that object is available under high Q conditions. For example, if the object is cached in the first region; or potentially computable—but only if the region is on renewable energy. The client may be expected to accept a stale answer. Otherwise, the client is denied the object, and the application will "make do" without (contextually this may be because the application already has some version of the data available, and the app business logic does not demand a completely fresh version of the data).

Image & Video Manager: Less Preparatory Action. Image management services may have policies that prepare images ahead of time according to certain choices by the customer. These sorts of preparatory actions could be suppressed in a more carbon-friendly mode, guaranteeing that images are only computed when actually requested by a user. Or, alternatively, preparatory work could be concentrated in only one point-of-presence, with all uncached requests routed there, even a long way, if the network is "sure" that an object would be ready there.

Prefetch: Suppress. Prefetch of objects mentioned in an HTML page or other document passing through a CDN node could be suppressed to save energy.

Reduced Logging and Other Side Effects. Logging, real time data delivery, logging & marketing beacons, etc, all are side effects of requests that have an energy impact. A request in 'green' mode could skip or minimize these activities to reduce carbon usage.

Serve-Stale Even When Up. It is known in the art to serve stale content when an origin server is down, but in the context of power consumption and Q improvements, this might be more intentionally done, especially if the various contexts of a digital property's URL structure have been considered ahead of time and the decisions made. When "turning the knob" certain pages and API calls that don't need to be completely current can yield stale answers on purpose, depending on whether the request would need to flow towards activities and locales that are going to burn carbon to achieve an answer. This might hinge on whether the next node is hydrocarbon-based rather than the current node.

Deploy Alternative Javascript Client-Side. Alternative Javascript will be deployable to also cut down on computation client-side. When a digital property owner chooses a "higher Q" mode, this can activate an alternative script (e.g., JavaScript) files, if available from their web design team, that forego certain functionality. For example, instead of deploying "ads.js" to a page, the object "ads-green.js" could be served under the same name, which selects static advertisements. (This particular example may change advertising revenue, but other examples might simply affect page layout.)

Tracing of Impact

Each node in the CDN network can augment a request header, adding one if needed from the client (some smart clients may provide one up-front with on-client activity passed in). Conceptually the header measures "achieved Q" which can be thought of as "carbon impact". Roughly speaking, a node can account for a guesstimate of the network hop impact, and of its own on-server impact. In some embodiments this is an estimate that more closely resembles real-world metrics such as fractions of tons of carbon emitted.

This header's data would then eventually make it to origin for requests that make it that far. The origin may capture that information and augment it with their own assessment of origin infrastructure impact.

This header's data would also be logged, made available for log delivery, stream processing, etc., and the data would be aggregated in various ways, including, importantly, top-line numbers for the digital property owner to review for their entire digital property or entire account. The origin infrastructure information could also be able to be fed back into the CDN for additional summing. An API would be available to query this information periodically for customer administrative dashboards.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 2:
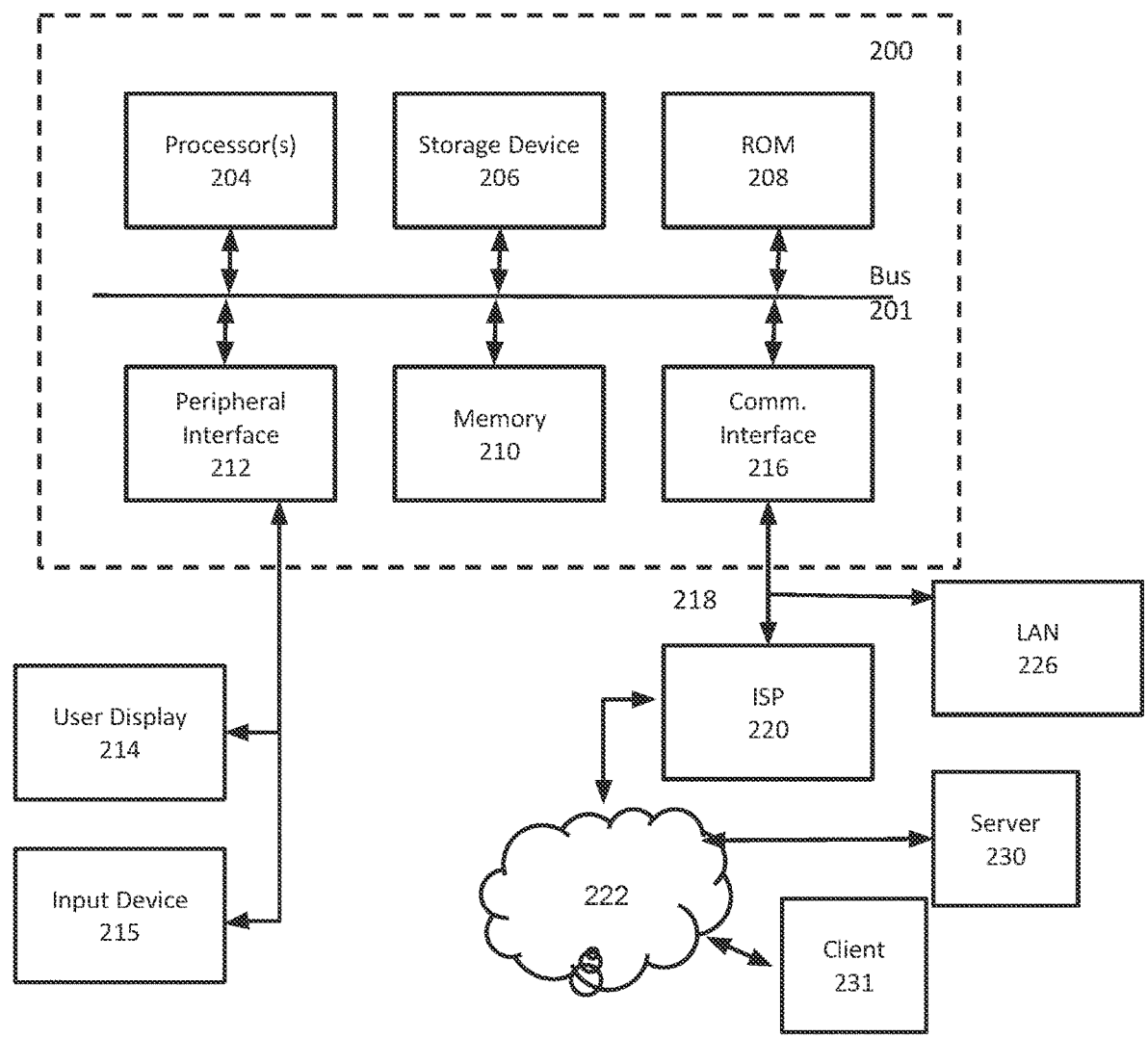

FIG. 2 is a block diagram that illustrates hardware in a computer system 200 upon which such software may run in order to implement embodiments of the invention. The computer system 200 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 200 includes a microprocessor 204 coupled to bus 201. In some systems, multiple processor and/or processor cores may be employed. Computer system 200 further includes a main memory 210, such as a random access memory (RAM) or other storage device, coupled to the bus 201 for storing information and instructions to be executed by processor 204. A read only memory (ROM) 208 is coupled to the bus 201 for storing information and instructions for processor 204. A non-volatile storage device 206, such as a magnetic disk, solid state memory (e.g., flash memory), or optical disk, is provided and coupled to bus 201 for storing information and instructions. Other application-specific integrated circuits (ASICs), field programmable gate arrays (FPGAs) or circuitry may be included in the computer system 200 to perform functions described herein.

A peripheral interface 212 may be provided to communicatively couple computer system 200 to a user display 214 that displays the output of software executing on the computer system, and an input device 215 (e.g., a keyboard, mouse, trackpad, touchscreen) that communicates user input and instructions to the computer system 200. However, in many embodiments, a computer system 200 may not have a user interface beyond a network port, e.g., in the case of a server in a rack. The peripheral interface 212 may include interface circuitry, control and/or level-shifting logic for local buses such as RS-485, Universal Serial Bus (USB), IEEE 1394, or other communication links.

Computer system 200 is coupled to a communication interface 216 that provides a link (e.g., at a physical layer, data link layer,) between the system bus 201 and an external communication link. The communication interface 216 provides a network link 218. The communication interface 216 may represent an Ethernet or other network interface card (NIC), a wireless interface, modem, an optical interface, or other kind of input/output interface.

Network link 218 provides data communication through one or more networks to other devices. Such devices include other computer systems that are part of a local area network (LAN) 226. Furthermore, the network link 218 provides a link, via an internet service provider (ISP) 220, to the Internet 222. In turn, the Internet 222 may provide a link to other computing systems such as a remote server 230 and/or a remote client 231. Network link 218 and such networks may transmit data using packet-switched, circuit-switched, or other data-transmission approaches.

In operation, the computer system 200 may implement the functionality described herein as a result of the processor executing code. Such code may be read from or stored on a non-transitory computer-readable medium, such as memory 210, ROM 208, or storage device 206. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 218 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. In a multi-tenant service platform having a plurality of computer network nodes, a method of providing one or more services from the service platform, the method comprising:
   A. enabling a tenant of the multi-tenant service platform to specify an acceptable performance degradation value (APD) for a service in association with a desired quality of electricity (DQ) for the electricity consumed to provide the service, wherein quality (Q) of electricity is a function of how electricity was produced;
   B. at a node in the multi-tenant service platform, receiving a request for the service from a client;
   C. determining the APD and DQ applicable to the request for the service;
   D. determining whether the request can be transferred to another node in the multi-tenant service platform with Q>=DQ without degrading the service beyond APD;
   E. upon a determination that the request cannot be so transferred, consulting a configuration for the tenant that specifies one or more actions to take to reduce power use at the node; and,
   F. taking at least one of the one or more actions.

2. The method of claim 1, the one or more actions comprising one or more expendable service features.

3. The method of claim 1, the one or more actions comprising at least one of:
   (i) ignoring or denying the request,
   (ii) override an application of a service feature otherwise applicable,
   (iii) override an invocation of a side effect of a service otherwise applicable, the side effect comprising any of logging, reporting, and performance monitoring, and,
   (iv) provide any of a stale and an alternate version of content to the client.

4. The method of claim 1, wherein the determination of the applicable APD and DQ is based at least in part on a device type of the client.

5. The method of claim 1, wherein the quality (Q) of electricity is a a function of day or time at which the request for the service is received.

6. The method of claim 1, wherein each of the one or more actions is associated with known reduction in power usage, which the node logs in association with the request.

7. The method of claim 1, wherein the APD indicates an acceptable latency.

8. The method of claim 1, wherein the APD is a time value that varies across segments of a given multimedia stream.

9. The method of claim 1, wherein Q reflects a carbon cost of producing the electricity.

10. The method of claim 1, wherein the APD is a function of day or time and said determination of the APD applicable to request comprises determining the APD at the day or time of the request.

11. The method of claim 1, wherein the one or more actions comprises:
    (i) ignoring or denying the request.

12. The method of claim 1, wherein the one or more actions comprises:
    (ii) override the application of a service feature otherwise applicable in accord with a service configuration controlled by the tenant.

13. The method of claim 1, wherein the one or more actions comprises:
(iii) override an invocation of a side effect of a service otherwise applicable, the side effect comprising any of logging, reporting, and performance monitoring.

14. The method of claim 1, wherein the one or more actions comprises:
(iv) provide any of a stale and an alternate version of content to the client.

15. The method of claim 1, wherein any of APD and DQ is dependent on a supporting service required to handle the request.

16. A multi-tenant service platform having a plurality of computer network nodes that provide one or more services from the service platform, each of the plurality of computer network nodes comprising at least one hardware processor and memory storing computer program instructions for execution on the at least one hardware processor to operate the respective computer network node, the service platform comprising:
A. a user interface enabling a tenant of the multi-tenant service platform to specify an acceptable performance degradation value (APD) for a service in association with a desired quality of electricity (DQ) for the electricity consumed to provide the service, wherein quality (Q) of electricity is a function of how electricity was produced;
B. a node in the multi-tenant service platform that receives a request for the service from a client, and in response, operable to:
determine the APD and DQ applicable to the request for the service, where APD and DQ are based on one or more attributes of the request;
determine whether the request can be transferred to another node in the multi-tenant service platform with Q>=DQ without degrading the service beyond APD;
upon a determination that the request cannot be so transferred, consult a configuration for the tenant that specifies one or more actions to take to reduce power use at the node; and,
take at least one of the one or more actions.

17. A non-transitory computer readable medium holding program instructions for execution on one or more hardware processors, the program instructions comprising instructions to:
A. enable a tenant of a multi-tenant service platform to specify an acceptable performance degradation value (APD) for a service in association with a desired quality of electricity (DQ) for the electricity consumed to provide the service, wherein quality (Q) of electricity is a function of how electricity was produced;
B. at a node in the multi-tenant service platform, receive a request for the service from a client;
C. determine the APD and DQ applicable to the request for the service, where APD and DQ are based on one or more attributes of the request;
D. determine whether the request can be transferred to another node in the multi-tenant service platform with Q>=DQ without degrading the service beyond APD;
E. upon a determination that the request cannot be so transferred, consult a configuration for the tenant that specifies one or more actions to take to reduce power use at the node; and,
F. take at least one of the one or more actions.

* * * * *